United States Patent [19]

Kane

[11] 4,169,824
[45] Oct. 2, 1979

[54] RED MUD TREATMENT

[75] Inventor: James Kane, Olympia Fields, Ill.

[73] Assignee: Nalco Chemical Company, Oak Brook, Ill.

[21] Appl. No.: 911,027

[22] Filed: Jun. 5, 1978

Related U.S. Application Data

[63] Continuation-in-part of Ser. No. 882,680, Mar. 2, 1978, abandoned, which is a continuation-in-part of Ser. No. 808,770, Jun. 22, 1977, abandoned.

[51] Int. Cl.$^2$ ............................................. C08L 33/02
[52] U.S. Cl. .............................. 260/29.6 M; 423/111; 423/119
[58] Field of Search ................... 260/29.6 H, 29.6 M; 423/111, 119, 122, 625; 252/8.5 C

[56] References Cited

U.S. PATENT DOCUMENTS

| 3,390,959 | 7/1968 | Sibert | 423/122 |
| 3,397,953 | 8/1968 | Galvin | 423/119 |
| 3,419,502 | 12/1968 | Newman | 252/180 |
| 3,425,802 | 2/1969 | Booth | 210/73 R |

Primary Examiner—Paul R. Michl
Attorney, Agent, or Firm—John G. Premo; Robert A. Miller

[57] ABSTRACT

A method of fluidizing concentrated aqueous suspensions of red mud which comprises uniformly admixing with such suspensions at least 0.1 pound per metric ton of an acrylic acid polymer which has a molecular weight within the range of 5,000–30,000.

2 Claims, No Drawings

RED MUD TREATMENT

This application is a continuation-in-part of my copending application Ser. No. 882,680 filed Mar. 2, 1978 now abandoned, which in turn is a continuation-in-part of Ser. No. 808,770 filed June 22, 1977, now abandoned.

INTRODUCTION

The almost universally used process for the manufacture of alumina is the Bayer process. In its broadest aspects, this method is carried out almost exclusively in aqueous solution, and is achieved by reaction of bauxite and a strong base such as caustic soda or lime in steam-heated autoclaves whereby the alumina is transformed into a soluble aluminate form. In this step, a considerable amount of insoluble impurities result or are released from the bauxite, which must be separated from the desired alumina constituent. These residues, commonly known as red muds, include iron oxides, sodium alumino-silicate, titanium oxide and other materials. Generally, these muds appear as very fine particles which are difficult to separate out. Yet, the red muds which usually constitute about 10-55% by weight of the ore must be rapidly and cleanly separated from the solubilized alumina liquor. It is important that the excess caustic also be recovered and reused in subsequent runs.

The separation of red mud from alumina and caustic solution is generally effected by first treating the red mud suspension or slurry with chemicals to promote flocculation of solids contained therein. The initial separation in the primary settlers is followed by a wash step. Specifically, the primary settler solid, normally a 15-30% solid slurry, is washed with on-coming liquor from the washing cycle, i.e., Counter Current Displacement Wash Circuit or sand filter, which ever is being utilized. The resultant underflow generally having from 15-40% solids is subsequently washed a plurality of times. The wash waters containing suspended red mud and dissolved alumina and caustic are then also treated with chemicals to promote settling.

After the final wash step, the mud is normally concentrated via vacuum filtration or other means to plastic mass which must be transported and acted upon by chemical processing equipment such as conveyors, mixers, raking devices and the like. The concentration of the red mud contained in these solid-like suspensions can range between 50-65%. The handling of such unworkable masses has always been a problem to the aluminum manufacturing industry. If it were possible to readily decrease the viscosity of these materials so they could be acted upon by means of pumps and other fluid-handling devices, a great improvement would be made in this art.

THE INVENTION

In accordance with the invention, it has been found that concentrated aqueous slurries of red mud can be fluidized by uniformly admixing with such suspensions at least 0.1-1.6 pounds per dry metric ton of red mud of an acrylic acid polymer which has a molecular weight within the range of 5,000-30,000. Preferably, from 0.10-1.0 pound of polymer on a dry basis will be used to treat each metric ton of dry red mud. It will be seen by those skilled in the art the above described polymeric materials are generally used in the form of an aqueous solution. When used, as for example, in a 20% by weight aqueous solution, from about 0.5-7.0 and preferably 0.5-1.5 pounds of the 20% aqueous solution of the acrylic acid polymer will be utilized for each dry metric ton of red mud.

As indicated above, the molecular weights of these polymers can vary between 5,000 and 30,000. A preferred molecular weight range of the polymer is between 8,000 and 20,000.

The acrylic acid polymers used in the practice of the invention may be either homopolymers or copolymers of acrylic acid. When used as copolymers, they should contain at least 50% by weight of acrylic acid. These acrylic acid polymers are preferably used in the form of their alkali metal or ammonium salts.

Preferred copolymers are copolymers of acrylic acid which have been polymerized with from 5-40% by weight of methylmethacrylate. Other comonomers that may be used in preparing the acrylic acid copolymers are acrylamide, maleic anhydride and other monomers used in such an amount and of such a type so as not to render the polymers water insoluble.

A convenient method of preparing acrylic acid copolymers and homopolymers resides in the alkaline hydrolysis of low molecular weight polyacrylonitrile (see U.S. Pat. No. 3,419,502). These materials generally contain up to 85% acrylate functionality after this hydrolysis step. The polymer will generally also contain some amide functionality as well as nitrile functionality.

EVALUATION OF THE INVENTION

The composition used in the following examples is an acrylic acid polymer which was an approximately 23.6% aqueous solution of an acrylic acid copolymer which contains 15% by weight of methylmethacrylate. The polymer was in the sodium salt form. This polymer is referred to as Polymer A.

EXAMPLE I

A 500 cc sample of a non-flowing 35% solids red mud slurry was placed in an 800 cc beaker and subjected to high speed agitation with a laboratory four blade metal propeller mixer. 8.75 cc of an 1.0% aqueous solution of Polymer A was added dropwise to the slurry toward the center of the rotary propeller. After the addition of the dilute solution of Polymer A, the slurry was allowed to mix for an additional 60 seconds. The resultant slurry was 100% flowable as evidenced by its ability to pour freely, and the vortex generated by the agitator. No viscosity measurements was made on the slurry due to lack of equipment.

EXAMPLE II

Polymer A was added in a 1.0% solution to the suction side of the last washer underflow pump of the Bayer alumina plant at a dosage of 0.75 pounds of the 23.6% aqueous solution of Polymer A or, 0.177 pounds of dry polymer per dry metric ton per dry ton. The addition was accomplished through an concentric ring distribution system having eight points of application in the pipe leading from the clarifier to the underflow pump. Polymer A was added at a pressure sufficient to cause penetration of the polymer solution into the red mud flowing through this pipe.

While the above example deals with an alumina plant employing conventional clarifiers for the concentration of the red mud, the polymer of the instant invention will perform equally well in plants employing vacuum filtration methods to concentrate the red mud. In using vacuum filtration techniques, the red mud is generally taken out of the vacuum filter using a mechanical device, oftentimes in auger. The polymer is applied to the material leaving the vacuum filtration unit and is sprayed uniformly on top of the material in the mechanical removal device.

Having thus described my invention, it is claimed as follows:

1. A method of fluidizing a flocculated red mud plastic mass which comprises uniformly admixing with the flocculated red mud plastic mass at least 0.10 pound per metric ton of an acrylic acid polymer as polymer based upon the dry weight of the red mud, said polymer having a molecular weight within the range of 5,000–30,000.

2. The method of claim 1 where the acrylic acid polymer contains from 10–30% by weight of methylmethacrylate.

* * * * *